United States Patent
Lu et al.

(10) Patent No.: US 6,741,901 B2
(45) Date of Patent: May 25, 2004

(54) SYSTEM AND METHOD FOR COORDINATED INTER-ORGANIZATIONAL INFORMATION SHARING

(75) Inventors: Hsueh-Chung Shelton Lu, Hsin-Tien (TW); Mavis Liao, Hsin-Tien (TW); Irving Fan, Hsin-Tien (TW)

(73) Assignee: Via Technologies, Inc., Taipei (TW)

( * ) Notice: Subject to any disclaimer, the term of this patent is extended or adjusted under 35 U.S.C. 154(b) by 0 days.

(21) Appl. No.: 10/428,790

(22) Filed: May 5, 2003

(65) Prior Publication Data

US 2003/0229409 A1 Dec. 11, 2003

Related U.S. Application Data

(60) Provisional application No. 60/385,896, filed on Jun. 6, 2002.

(30) Foreign Application Priority Data

Oct. 9, 2002 (TW) ........................................ 91123320 A

(51) Int. Cl.⁷ ............................................. G06F 19/00
(52) U.S. Cl. ........................... 700/97; 700/95; 700/105; 705/8
(58) Field of Search ............................ 700/90, 95, 97, 700/99, 105; 705/8; 707/102

(56) References Cited

U.S. PATENT DOCUMENTS

| | | | | | |
|---|---|---|---|---|---|
| 5,321,605 | A | * | 6/1994 | Chapman et al. | 705/7 |
| 5,463,555 | A | * | 10/1995 | Ward et al. | 700/96 |
| 5,659,478 | A | * | 8/1997 | Pennisi et al. | 700/95 |
| 5,777,877 | A | * | 7/1998 | Beppu et al. | 700/97 |

* cited by examiner

*Primary Examiner*—Jayprakash N. Gandhi
(74) *Attorney, Agent, or Firm*—Rabin & Berdo, P.C.

(57) ABSTRACT

A system for coordinated inter-organizational information sharing. The system includes an information exchange center, a design organization, a production organization, a test organization, and an application design organization. The production organization manufactures the product according to the design specification designed by the design organization, and sends manufacturing problems to the information exchange center. The test organization tests the product, and sends test problems to the information exchange center. The application design organization designs peripheral applications according to the design specification without the product, tests the peripheral applications with the product, and sends application test problems to the information exchange center.

10 Claims, 4 Drawing Sheets

SYSTEM AND METHOD FOR COORDINATED INTER-ORGANIZATIONAL INFORMATION SHARING

REFERENCE TO PROVISIONAL APPLICATION

This application claims priority under 35 USC §119(e) of applicants' provisional application Serial No. 60/385,896, filed Jun. 6, 2002.

BACKGROUND OF THE INVENTION

1. Field of the Invention

The present invention relates to a system and method for coordinating inter-organizational information sharing, and particularly to a system and method for coordinating inter-organizational information sharing that constructs an information exchange center to exchange technology specifications, problems for production, and others via networks, so as to reduce required time for developing products.

2. Description of the Related Art

The progress for developing a product includes several stages, such as design, manufacture, test, peripheral application design, and others. Each manufacturing step of the progress is responsible to a respective company or organization, such as a department, and section. The conventionally manufacturing steps of the progress must run in sequence, therefore a product should be produced by following this sequence. For example, a product cannot be made until the product is designed, the product cannot be tested until the product is produced, and the peripheral applications cannot be designed except the product passes the test.

FIG. 1 shows the flow for developing an IC (Integrated Circuit) product conventionally. A technology specification (including layout) of the IC product is designed by an IC design house in step S100. Then, in step S110, the IC product is manufactured by a wafer foundry according to the technology specification after the technology specification is verified by the IC design house. Thereafter, in step S120, the IC product is packaged and tested by a packaging and testing agent. Finally, in step S130, the peripheral application for the IC product, such as the layout of PCB (Printed Circuit Board) is designed.

Since these manufacturing steps must run in sequence, the process is obvious a time-consuming way for product developments. For products of advanced technology, the series of development, consolidation deployment, and production is repeated in each of the manufacturing steps, so as to correct the design of products or to overcome problems in manufacturing. With the "series" characteristic of technology, the time for the products of advanced technology to market is delayed if conventional progress for developing products is employed.

SUMMARY OF THE INVENTION

It is therefore an object of the present invention to provide a system and method for coordinating inter-organizational information sharing that constructs an information exchange center to real-time exchange technology specifications, problems for production, and others via networks. Works among organizations can be coordinated and proceeded simultaneously, problems can be solved as soon as possible, and the waiting time between organizations can be degraded.

To achieve the above objects, the present invention provides a system and method for coordinating inter-organizational information sharing. According to one embodiment of the invention, the system includes an information exchange center, a design organization, a production organization, a test organization, and an application design organization.

The design organization sends a design specification of a product to the information exchange center. The production organization manufactures the product according to the design specification specialized for the production organization stored in the information exchange center, and sends manufacturing problems occurring during manufactures to the information exchange center. The test organization tests the product manufactured by the production organization and then sends test problems occurring during testing procedures to the information exchange center.

In addition, the application design organization designs peripheral applications for the product according to the design specification specialized for the application design organization stored in the information exchange center even the product is not completely ready yet. After the product is manufactured and tested, the application design organization tests the peripheral applications with the product, and sends application test problems occurring during testing the peripheral applications with the product to the information exchange center.

The design organization may connect to the information exchange center to review the manufacturing problems, test problems, and application test problems so as to modify or redesign the design specification. The design organization, the production organization, the test organization, and the application design organization can access the problems stored in the information exchange center so that the efforts among organizations can be properly coordinated.

According to another embodiment of the invention, a method for coordinating inter-organizational information sharing is provided.

First, a design specification of a product is designed by a design organization, and the design specification is then sent to an information exchange center. Thereafter, the product is manufactured by a production organization according to the design specification specialized for the production organization and stored in the information exchange center, and all manufacturing problems arisen from manufacturing procedures are uploaded to the information exchange center. Thereafter, the product manufactured by the production organization is tested by a test organization, and test problems arisen from testing procedures are also delivered to the information exchange center.

Peripheral applications for the product are designed by an application design organization according to the design specification specialized for the application design organization and stored in the information exchange center even the product is not ready yet. After the product is manufactured and tested, the peripheral applications regarding the product are tested by the application design organization, and application test problems arisen from during testing the peripheral applications are uploaded to the information exchange center.

The manufacturing problems, test problems, and application test problems stored in the information exchange center can be accessed by the design organization to modify or redesign the design specification. The problems stored in the information exchange center can also be accessed by the design organization, the production organization, the test organization, and the application design organization so that the efforts among these organizations can be properly coordinated.

BRIEF DESCRIPTION OF THE DRAWINGS

The aforementioned objects, features and advantages of this invention will become apparent by referring to the following detailed description of the preferred embodiment with reference to the accompanying drawings, wherein.

DETAILED DESCRIPTION OF THE INVENTION

Figure 1:
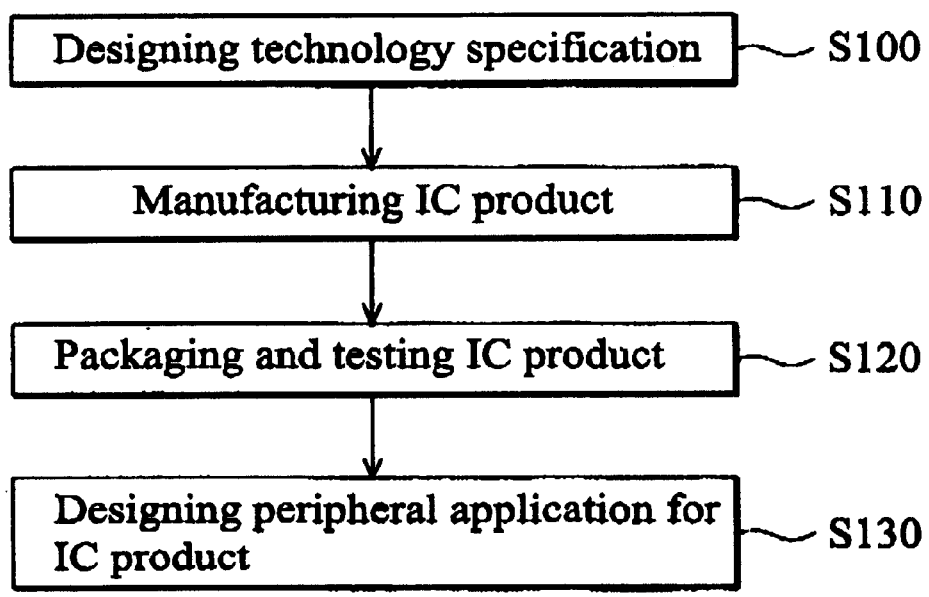
FIG. 1 is a flowchart illustrating the flow for developing an IC product.
Figure 2:
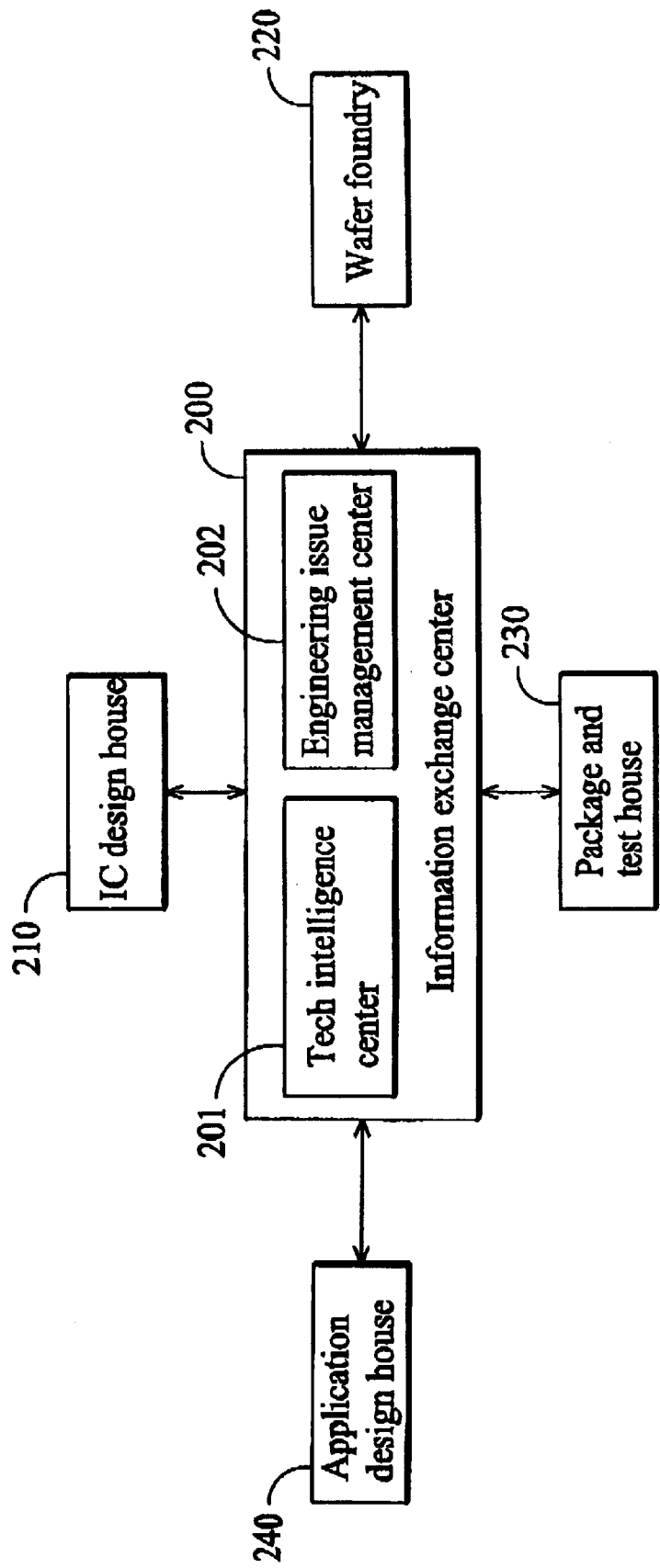
FIG. 2 is a schematic diagram showing the architecture of the system for coordinating inter-organizational information sharing according to the embodiment of the present invention.

FIG. 2 is a schematic diagram showing the architecture of the disclosed system for coordinating inter-organizational information sharing according to the embodiment of the present invention. It should be noted that the manufacturing organizations for IC products are discussed in this embodiment, but are not limited thereto.

According to the embodiment of the invention, the system for coordinating inter-organizational information sharing includes an information exchange center 200, an IC design house 210, a wafer foundry 220, a packaging and testing agent 230, and an application design house 240. The information exchange center 200 includes a tech intelligence center 201 and an engineering issue management center 202.

The IC design house 210 creates a design specification including required layout and relative information regarding the manufacturing technology of an IC product, and delivers the design specification to the tech intelligence center 201 in the information exchange center 200.

The wafer foundry 220 manufactures the IC product according to the design specification stored in the tech intelligence center 201, and then uploads manufacturing problems arisen from manufacturing procedures to the engineering issue management center 202 in the information exchange center 200. After the IC product is manufactured, the packaging and testing agent 230 tests the product, and uploads test problems arisen from testing procedures to the engineering issue management center 202 in the information exchange center 200.

The application design house 240 establishes peripheral applications, such as the layout of PCB (Printed Circuit Board) for the IC product according to the design specification stored in the tech intelligence center 201 of the information exchange center 200 before the IC product is manufactured. After the IC product is manufactured and tested, the application design house 240 tests the peripheral applications with the IC product, and uploads application test problems arisen from testing procedures to the engineering issue management center 202 in the information exchange center 200.

It should be noted that the IC design house 210, the wafer foundry 220, the packaging and testing agent 230, and the application design house 240 may connect to the information exchange center 200 to download the design specification and relative information. They may provide solutions for the problems regarding their businesses. The problems stored in the information exchange center 200 can be accessed by the IC design house 210, the wafer foundry 220, the packaging and testing agent 230, and the application design house 240 so that the efforts among these organizations can be properly coordinated. The IC design house 210 may connect to the information exchange center 200 to review the manufacturing problems, test problems, and application test problems to modify or redesign the design specification.

After the design specification is modified or redesigned, it is sent to the tech intelligence center 201 in the information exchange center 200. The wafer foundry 220 may manufacture new IC product according to the redesigned design specification in the tech intelligence center 201 and the solutions for the problems in the engineering issue management center 202. Similarly, the application design house 240 may design new peripheral applications for the new IC product according to the redesigned design specification stored in the tech intelligence center 201 of the information exchange center 200.

Figure 3A:
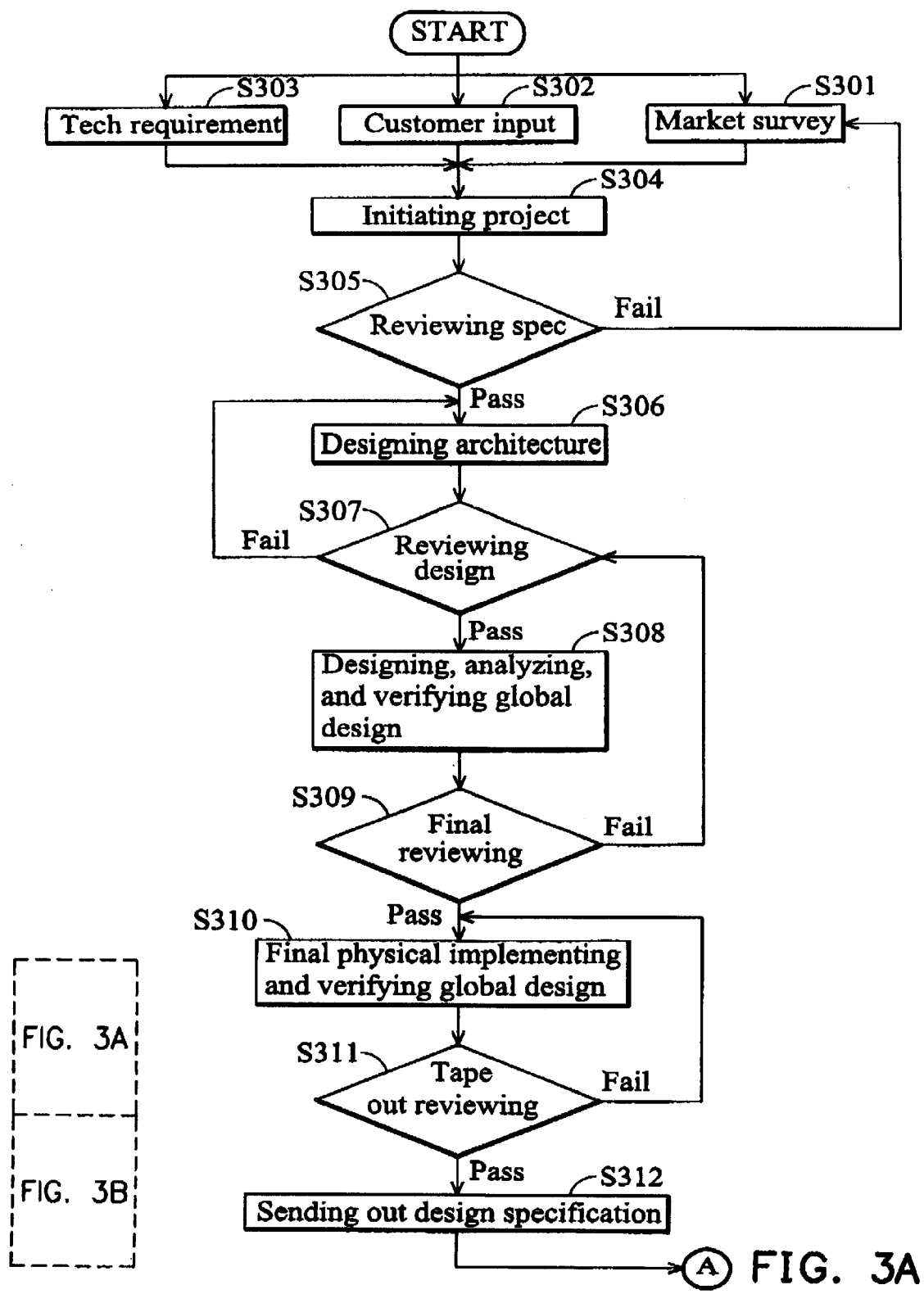
FIGS. 3A and 3B shows a flowchart illustrative of the operation method for coordinating inter-organizational information sharing according to the embodiment of the present invention.
Figure 3B:
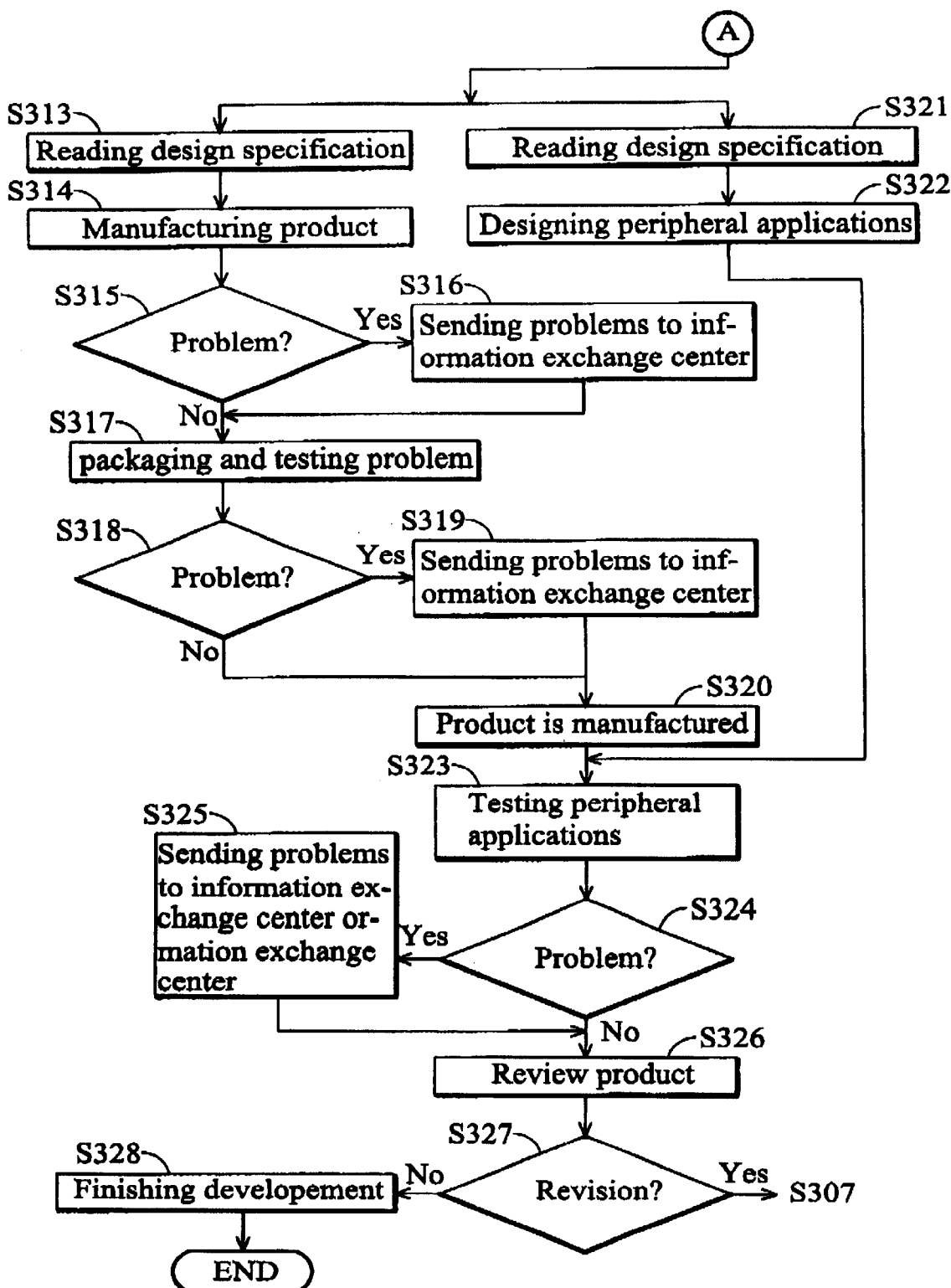

FIGS. 3A and 3B are a flowchart illustrating the operation of the method for coordinated inter-organizational information sharing according to the embodiment of the present invention.

First, in step S301, S302, and S303, after customer input and tech requirements are input to an IC design house, and market survey is finished, a project for a product is initiated and a specification for the product is defined (step S304). Then, in step S305, the specification is reviewed. If the specification does not conform to the condition of current technology (Fail in step S305), the flow returns to step S301 for another market survey; otherwise (Pass in step S305), in step S306, the architecture of the product is designed.

After the design (architecture design for the product) is finished, the design is reviewed (Step S307). If bugs occur in the design or the design does not conform to the original expectation (Fail in step S307), the flow returns to step S306 to modify the design; otherwise (Pass in step S307), in step S308, the global design for the product is designed, analyzed, and verified. Note that system, logic, and circuit design, packaging design, testing program, and validation preparation, system verification, and timing integrity analysis are included in step S308.

Then, in step S309, the global design is finally reviewed. If bugs occur in the global design or the global design does not conform to the original expectation (Fail in step S309), the flow returns to step S307; otherwise (Pass in step S309), in step S310, the global design for the product is finally physically implemented and verified. Then, in step S311, the global design after final physical implementation and verification is reviewed before tape out. If errors occur (Fail in step S311), the flow returns to step S310; otherwise (Pass in step S311), in step S312, the design specification of the product is sent to the tech intelligence center 201 in the information exchange center 200.

Thereafter, in step S313, the design specification stored in the tech intelligence center 201 of the information exchange center 200 is read by a wafer foundry. Then, in step S314, the product is manufactured according to the design specification. If manufacture problems occur (Yes in step S315), the problems are sent to the engineering issue management center 202 in the information exchange center 200 (S316); otherwise, in step S317, the product is packaged and tested by a packaging and testing agent. If test problems occur during testing (Yes in step S318), the test problems are sent to the engineering issue management center 202 in the information exchange center 200. After packaging and testing, the product is completely manufactured (S320).

In addition, in step S321, the design specification stored in the tech intelligence center 201 of the information exchange center 200 is read by an application design house, and in step S322, peripheral applications for the product are designed according to the design specification before the IC product is manufactured.

After the product is manufactured, peripheral applications with the product are tested, debugged, and verified (S323). Similarly, in step S325, application test problems are sent to the engineering issue management center 202 in the information exchange center 200 if the application test problems occur during testing the peripheral applications (Yes in step S324) Thereafter, in step S326, the product is finally reviewed. If revision of the product is needed (Yes in step S327), the flow returns to step S307; otherwise the progress for developing the product is finished (S328).

Similarly, the manufacturing problems, test problems, and application test problems stored in the information exchange center can be accessed by the IC design house to redesign the design specification. The problems stored in the information exchange center can be accessed by the IC design house, the wafer foundry, the packaging and testing agent, and the application design house to coordinate efforts between organizations.

As a result, using the system and method coordinated inter-organizational information sharing according to the present invention, an information exchange center can be employed to exchange technology specifications, problems for production, and others via networks in real-time, so efforts between organizations can be coordinated and proceed simultaneously, problems can be solved as soon as possible, and the waiting time between organizations can be reduced.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A system for coordinated inter-organizational information sharing, comprising:
    an information exchange center having a tech intelligence center and an engineering issue management center;
    a design organization to send a design specification of a product to the tech intelligence center in the information exchange center;
    a production organization to manufacture the product according to the design specification stored in the tech intelligence center of the information exchange center, and send manufacturing problems occurring during manufacture to the engineering issue management center in the information exchange center;
    a test organization to test the product manufactured by the production organization, and send test problems occurring during testing to the engineering issue management center in the information exchange center; and
    an application design organization to design peripheral applications for the product according to the design specification stored in the tech intelligence center of the information exchange center without the product, test the peripheral applications with the product after the product is manufactured and tested, and send application test problems occurring during testing the peripheral applications with the product to the engineering issue management center in the information exchange center,
    wherein the design organization connects to the information exchange center to review the manufacturing problems, test problems, and application test problems to redesign the design specification.

2. The system as claimed in claim 1 wherein the design organization further sends the redesigned design specification to the tech intelligence center in the information exchange center.

3. The system as claimed in claim 2 wherein the production organization further manufactures a new product according to the redesigned design specification and the manufacturing problems, test problems, and application test problems in the information exchange center.

4. The system as claimed in claim 2 wherein the application design organization further designs new peripheral applications for the new product according to the redesigned design specification and the manufacturing problems, test problems, and application test problems in the information exchange center.

5. The system as claimed in claim 1 wherein the design organization, the production organization, the test organization, and the application design organization can connect to the information exchange center to review the manufacturing problems, test problems, and application test problems for coordinated inter-organizational information sharing.

6. A method for coordinated inter-organizational information sharing, comprising:
    designing of a design specification of a product by a design organization;
    sending of the design specification to a tech intelligence center in an information exchange center by the design organization;
    manufacture of the product by a production organization according to the design specification stored in the tech intelligence center of the information exchange center;
    sending of manufacturing problems occurring during manufacture to an engineering issue management center in the information exchange center by the production organization;
    testing of the product manufactured by the production organization by a test organization;
    sending of test problems occurring during testing to the engineering issue management center in the information exchange center by the test organization;
    designing of peripheral applications for the product by an application design organization according to the design specification stored in the tech intelligence center of the information exchange center without the product;
    testing of the peripheral applications with the product by the application design organization after the product is manufactured and tested; and
    sending of application test problems occurring during testing the peripheral applications with the product to the engineering issue management center in the information exchange center by the application design organization,
    wherein the manufacturing problems, test problems, and application test problems can be read by the design organization to redesign the design specification.

7. The method as claimed in claim 6 further comprising sending of the redesigned design specification to the tech intelligence center in the information exchange center by the design organization.

8. The method as claimed in claim 7 further comprising manufacture of a new product by the production organization according to the redesigned design specification and the manufacturing problems, test problems, and application test problems in the information exchange center.

9. The method as claimed in claim 7 further comprising designing of new peripheral applications for the new product by the application design organization according to the redesigned design specification and the manufacturing problems, test problems, and application test problems in the information exchange center.

10. The method as claimed in claim 6 wherein the design organization, the production organization, the test organization, and the application design organization further connect to the information exchange center to review the manufacturing problems, test problems, and application test problems for coordinated inter-organizational information sharing.

* * * * *